United States Patent
Cao et al.

(10) Patent No.: US 8,604,715 B2
(45) Date of Patent: Dec. 10, 2013

(54) LAMP TUBE SWITCH CIRCUIT AND METHOD THEREOF

(75) Inventors: Qing-Shan Cao, Shenzhen (CN); Zheng-Nian Liu, Shenzhen (CN); Yu Hu, Shenzhen (CN); Jian-Pu Chen, Shenzhen (CN)

(73) Assignees: Hong Fu Jin Precision (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 322 days.

(21) Appl. No.: 13/215,210

(22) Filed: Aug. 22, 2011

(65) Prior Publication Data

US 2013/0002151 A1    Jan. 3, 2013

(30) Foreign Application Priority Data

Jun. 28, 2011 (CN) .......................... 2011 1 0176621

(51) Int. Cl.
*H05B 37/02* (2006.01)
(52) U.S. Cl.
USPC ............ 315/308; 315/178; 315/362; 307/115
(58) Field of Classification Search
USPC ............... 307/38, 112, 113, 115; 315/178, 315/312–317, 320, 322, 324, 361, 291, 299, 315/308

See application file for complete search history.

(56) References Cited

U.S. PATENT DOCUMENTS

| 3,828,221 | A | * | 8/1974 | Spiteri | 315/161 |
| 4,064,519 | A | * | 12/1977 | Kee | 396/190 |
| 4,484,109 | A | * | 11/1984 | Buser | 315/290 |
| 8,147,091 | B2 | * | 4/2012 | Hsia et al. | 362/221 |
| 8,459,829 | B2 | * | 6/2013 | Cao et al. | 362/217.14 |
| 2012/0043909 | A1 | * | 2/2012 | Bloom et al. | 315/294 |

* cited by examiner

*Primary Examiner* — Thuy Vinh Tran
(74) *Attorney, Agent, or Firm* — Altis Law Group, Inc.

(57) ABSTRACT

A lamp tube switch circuit includes a first connector and a second connector for connecting a lamp tube, a power supply, a switch module including at least six switches connected between the power port, the first connector and second connector, a detecting unit connected between the first connector and the second connector, a control unit, a ballast and a starter. The detecting unit detects impedances between the pins of the lamp tube to determine the type of the lamp tube. The control unit is connected to the detecting unit, and operated to have some of the switches to turn one and the others to turn off whereby a drive circuit is formed enabling power from the power supply to flow through the lamp tube to make the lamp tube to generate light.

7 Claims, 3 Drawing Sheets

| Type number | Schematic | 1-2 | 1-3 | 1-4 | 2-3 | 2-4 | 3-4 | 131 | 132 | 133 | 134 | 135 | 136 | 137 |
|---|---|---|---|---|---|---|---|---|---|---|---|---|---|---|
| 1 | LED light | r | +∞ | +∞ | +∞ | +∞ | +∞ | 1 | 0 | 0 | 0 | 0 | 1 | 0 |
| 2 | LED light | 0 | r | r | r | r | 0 | 0 | 0 | 1 | 0 | 0 | 1 | 0 |
| 3 | LED light | +∞ | r | +∞ | +∞ | +∞ | +∞ | 1 | 0 | 0 | 1 | 0 | 0 | 0 |
| 4 | LED light | +∞ | +∞ | r | +∞ | +∞ | +∞ | 0 | 0 | 1 | 0 | 0 | 1 | 0 |
| 5 | LED light | r | 0 | r | r | 0 | r | 1 | 0 | 0 | 0 | 0 | 1 | 0 |
| 6 | Fluorescent | r | +∞ | +∞ | +∞ | +∞ | r | 0 | 1 | 0 | 1 | 0 | 0 | 1 |

FIG. 2

LAMP TUBE SWITCH CIRCUIT AND METHOD THEREOF

CROSS-REFERENCE TO RELATED APPLICATIONS

Related subject matter is disclosed in co-pending U.S. patents application with an Ser. No. 13/218,208 and a title of LAMP TUBE SWITCH CIRCUIT, and an Ser. No. 13/215,213 and a title of LAMP TUBE SWITCH CIRCUIT, which have the same assignees as the current application and were concurrently filed.

BACKGROUND

1. Technical Field

The present disclosure relates to switch circuits and, particularly, to a switch circuit for different types of lamp tubes and a method thereof.

2. Description of the Related Art

LEDs are widely used but conventional lamp holders, for example fluorescent lamp holders, cannot be used to hold LED lamps, and also, LED lamp holders cannot be used to hold fluorescent lamps. Therefore, if users want to replace a fluorescent lamp with an LED lamp or replace an LED lamp with a fluorescent lamp, they have to replace the holder as well.

Therefore, there is room for improvement within the art.

BRIEF DESCRIPTION OF THE DRAWINGS

The components in the drawings are not necessarily drawn to scale, the emphasis instead being placed upon clearly illustrating the principles of a lamp tube switch circuit and a method thereof. Moreover, in the drawings, like reference numerals designate corresponding parts throughout the several views.

FIG. 2 is a state diagram of the button module when different types of lamp tubes are selected for connection to the lamp tube switch circuit of FIG. 1.

DETAILED DESCRIPTION

Figure 1:
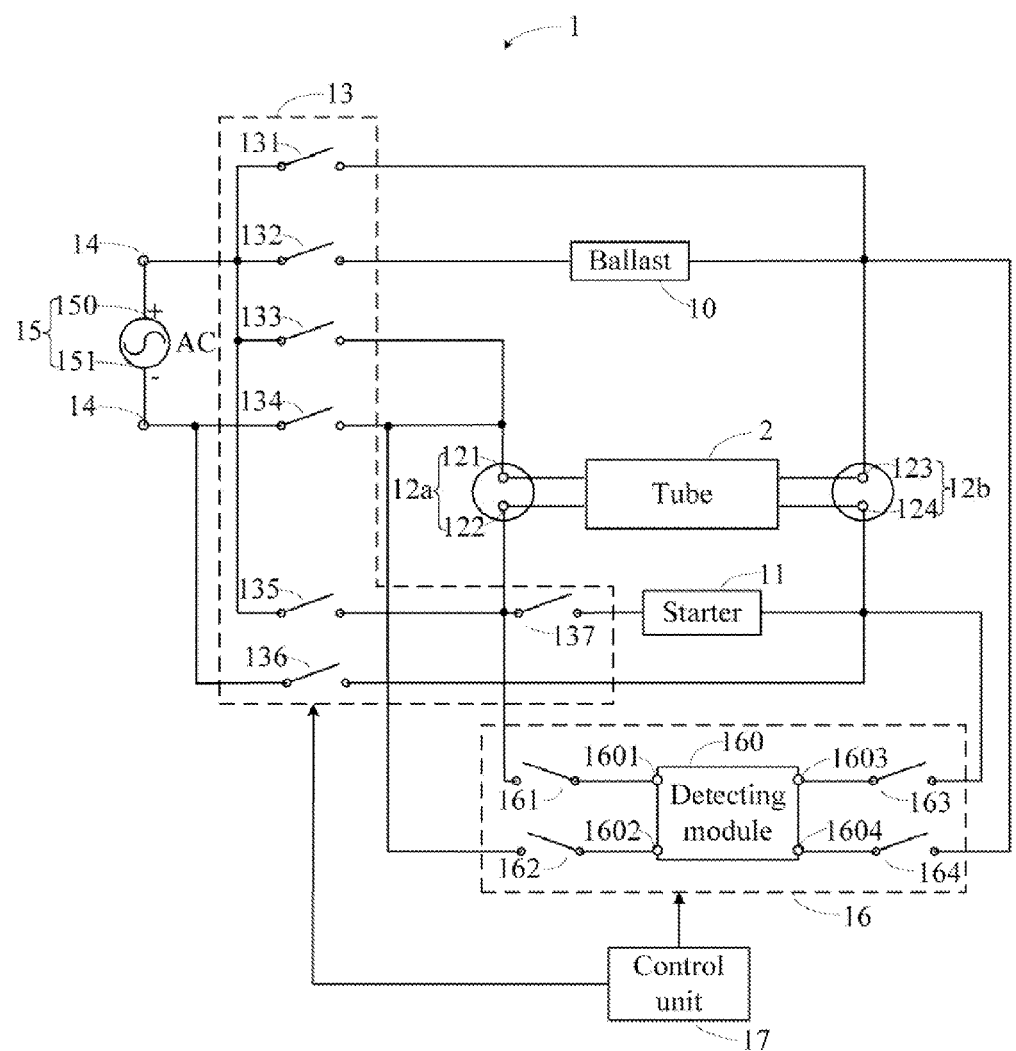
FIG. 1 is a circuit diagram of a lamp tube switch circuit in accordance with an exemplary embodiment.

Referring to FIG. 1, a lamp tube switch circuit 1 includes a ballast 10, a starter 11, a first connector 12a and a second connector 12b for connecting to a lamp tube 2, and a power port 14 for connecting a power supply 15. The circuit 1 further includes a switch module 13, a detecting unit 16, and a control unit 17. The control unit 17 is connected between the detecting unit 16 and the switch module 13 to manipulate the detecting unit 16 and receive signals from the detecting unit 16. Furthermore, the control unit manipulates the switch module 13 according to the received signals. The switch module 13 is connected between the power port 14, the first connector 12a and the second connector 12b. The ballast 10 and the starter 11 are connected between the switch module 13 and the second connector 12b. The switch module 13 includes at least two independent switches. The detecting unit 16 is connected between the first connector 12a and the second connector 12b, for detecting the impedance across the pins of the lamp tube 2. The relationship among types of lamp tubes, the impedances between the pins of each end pair, and the states of the at least two switches is predetermined. The control unit 17 may turn on several of the at least two switches, and must turn off the remaining incompatible switches according to the impedance detected by the detecting unit 16 and the predetermined relationships, so as to form a drive circuit which corresponds and is appropriate for the lamp tube 2 which is being used.

In the embodiment, the switch module 13 includes switches 131, 132, 133, 134, 135, 136, and 137. The switches 131, 132, 133, 134, 135, 136, and 137 are all relays. The control unit 17 may switch on or switch off the switches 131, 132, 133, 134, 135, 136, and 137 or any of them. The first connector 12a includes a first port 121 and a second port 122, and the second connector 12b includes a third port 123 and a fourth port 124.

A first end of each of the switches 131, 132, 133 and 135 is connected to a positive terminal 150 of the power supply 15, and a second end of the switch 132 is connected to a first end of the ballast 10. A second end of the ballast 10 and a second end of the switch 131 are connected to the third port 123. First ends of the switches 134 and 136 are connected to a negative terminal 151 of the power supply 15. Second ends of the switches 133 and 134 are connected to the first port 122, and a second end of the switch 136 is connected to the fourth port 124. The starter 11 is connected between a second end of the switch 137 and the fourth port 124.

The detecting unit 16 includes a detecting module 160. A pair of ports 1601 and 1602 connect to one end of the detecting module 160 and a pair of ports 1603 and 1604 connect to the other end of the module 160. In the embodiment, the detecting unit 16 further includes four switches 161, 162, 163, and 164. The switch 161 is connected between the second port 122 and the port 1601, the switch 162 is connected between the switch 134 and the port 1602, the switch 163 is connected between the fourth port 124 and the port 1603, and the switch 164 is connected between the third port 123 and the port 1604. When the lamp tube 2 is connected to the switching circuit 1, the control unit 17 turns on the switches 161, 162, 163, and 164. A mechanical switch (not shown) can be included and positioned for users to operate the switch module 13. The detecting module 160 detects the impedance between each pin of each end pair of pins of the lamp tube 2. The control unit 17 turns on and turns off the at least two switches according to the relationship. In an alternative embodiment, the switches 161, 162, 163, and 164 can be controlled manually.

FIG. 2 illustrates a state diagram of the impedances of the pins of the lamp tube when different types of lamp tubes are connected to the circuit 1. The diagram records predetermined relationships among types of lamp tubes, the impedances between end pins of the lamp tubes, and the states of the at least two switches. In this diagram, logic "1" is defined to be the "on" state of the at least two switches, and logic "0" is defined to be the "off" state of the at least two switches. "+∞" means the value of a resistance is larger than 50 M ohm (R>50 M ohm). The control unit 17 determines which type of lamp tube has been connected (or selected), and turns on and turns off the at least two switches according to the impedances of the pins as detected by the detecting module 160 and the relationships. Taking a first type of lamp tube as an example, which is an LED lamp tube, two conductive pins form the end pin pair on one end of the lamp tube, and two insulation pins form the end pin pair on the other end of the lamp tube. "NC" corresponds to the insulation pin. When the first type of lamp tube 2 is connected to the first connector 12a and the second connector 12b, the detecting module 160 detects the impedances between pins via the ports 1601, 1602, 1603, and 1604. For example, the detecting module 160 may detect the impedance between the pins connected to the first port 121 and the second port 122 via the port 1601 and the port 1602 respectively. The impedance between the two conductive pins is R, and the impedance between the other pair is "+∞" (shown in FIG. 2). The control unit 17 determines the selected type of lamp tube according to the impedances detected by the detecting module 160, and turns on or turns off the at least two switches of the switch module 13 according to the relationship. In the embodiment, the control unit 16 turns on the switches 131 and 136, and turns off the switches 132, 133, 134, 135, and 137. Thus, when the first type of lamp tube 2 is connected to the circuit 1, the two conductive pins are connected to the positive and negative terminals 150 and 151 via the third and fourth ports 123 and 124, and the two insulation pins are connected to the first and second ports 121 and 122. Thus, the drive circuit corresponding to and appropriate for the first type of lamp tube 2 is formed.

Taking a sixth type tube, namely a fluorescent tube, as an example, two conductive pins are mounted on each end of the fluorescent tube. The impedances between the two pins mounted on each end of the fluorescent tube are about the same, and the impedances between the other two pins are about equal to "+∞" (shown in FIG. 2). When the fluorescent tube is connected between the first connector 12a and the second connector 12b, the detecting module 160 detects the impedances between pins. The control unit 17 determines the selected or connected type of lamp tube according to the impedances detected by the detecting module 160, and turns on and turns off the at least two switches of the switch module 13 according to the relationship. In the embodiment, the control unit 16 turns on the switches 132, 134 and 137, and turns off the switches 131, 133, 135, and 136. Thus, when the fluorescent tube is connected to the switching circuit 1, the conductive pin connected to the first port 121 is connected to the negative terminal 151 of the power supply 15, and conductive pin connected to the second port 122 is connected to the positive terminal 150 of the power supply 15, the conductive pins connected to the third port 123 and the fourth port 124 are connected between the ballast 11 and the starter 11. Thus, the drive circuit corresponding to a fluorescent tube is formed, and the fluorescent tube can be driven to light.

Figure 3:
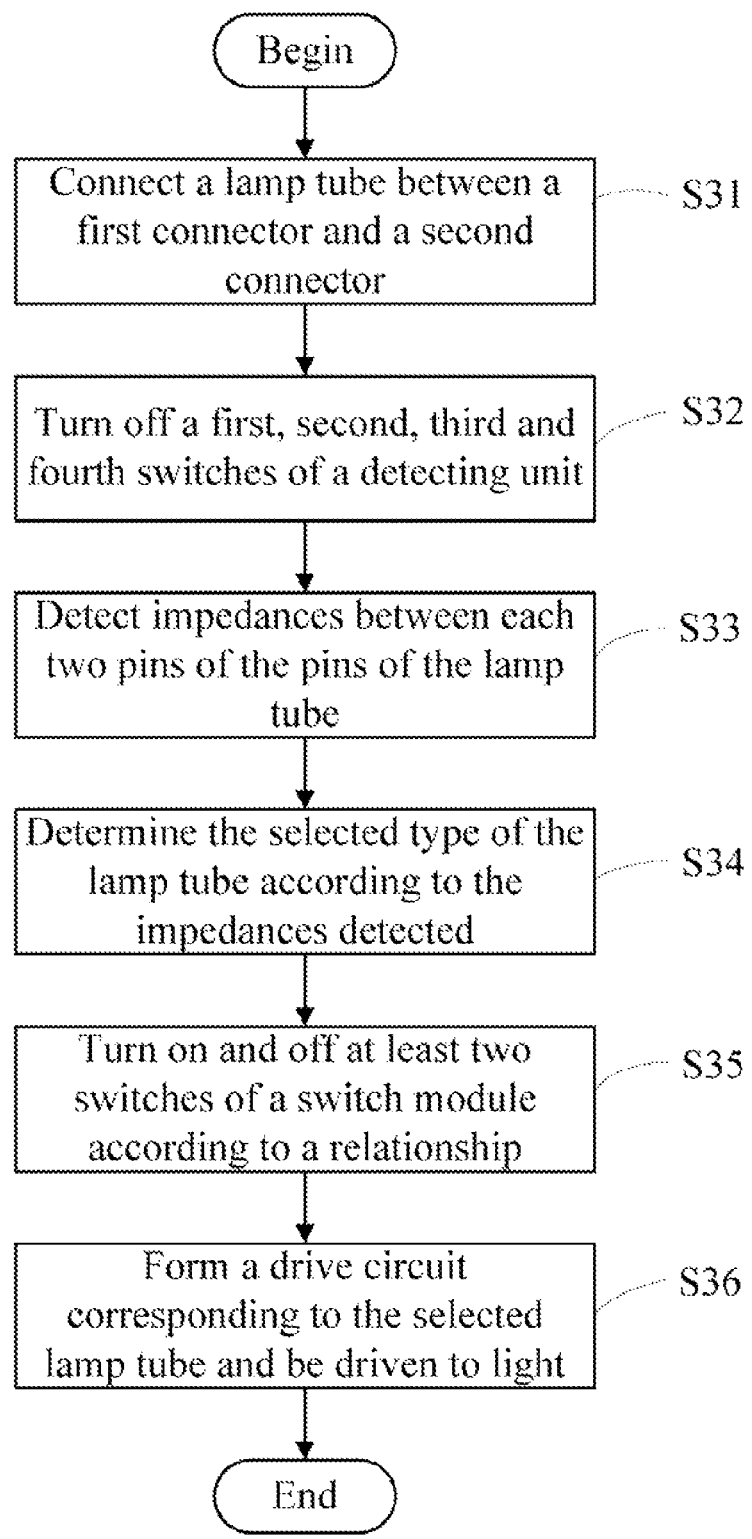
FIG. 3 is a flowchart of a method for switching different lamp tubes in accordance with an exemplary embodiment.

FIG. 3 is a flowchart of a method for switching different types of lamp tubes in accordance with an exemplary embodiment.

In step S31, the lamp tube 2 is connected between the first connector 12a and the second connector 12b.

In step S32, the control unit 17 provides a control signal to turn on the switches 161, 162, 163, and 164 of the detecting unit 16, thus the lamp tube 2 is connected to the detecting module 160.

In step S33, the detecting module 160 detects the impedances between each two pins of the pins of the lamp tube 2.

In step S34, the control unit 17 determines the connected or selected type of lamp tube 2 according to the impedances detected by the detecting module 160 and according to the relationship.

In step S35, the control unit 17 turns on or turns off the at least two switches of the switch module 13 according to the relationship.

The present disclosure may be embodied in other forms without departing from the spirit thereof. The present examples and embodiments are to be considered in all respects as illustrative and not restrictive, and the disclosure is not to be limited to the details given herein.

What is claimed is:

1. A lamp tube switch circuit for providing power to a lamp tube selected from one of different type of lamp tubes including at least a light emitting diode (LED) lamp tube and a fluorescent lamp tube, the switch circuit comprising:

a first connector comprising first and second ports and a second connector comprising third and fourth ports, wherein the first and second ports are for connecting two pins on an end of the lamp tube and the third and fourth ports are for connecting another two pins on an opposite end of the lamp tube;

a power supply having a positive terminal and a negative terminal;

a switch module comprising first, second and third switches each having a first end connecting with the positive terminal, fourth and fifth switches each having a first end connecting with the negative terminal and a sixth switch having a first end connecting with the second port;

a detecting unit connected between the first connector and the second connector, configured for detecting impedances between each two pins of the pins of the lamp tube connected between the first connector and the second connector; and a control unit connected to the detecting unit and the switch module, and configured to turn on or off the at the switches according to the impedances detected by the detecting unit to form a drive circuit to drive the lamp tube to light;

a ballast having a first end connected to a second end of the second switch and a second end connected to a second end of the first switch and the third port; and a starter having a first end connected to a second end of the sixth switch and a second end connected to the fourth port and a second end of the fifth switch, the third and fourth switches having second ends thereof connecting with the first port.

2. The switch circuit as recited in claim 1, wherein the first, second, third, fourth, fifth, and sixth switches are all relays.

3. The switch circuit as recited in claim 1, wherein the detecting unit comprises a detecting module, a first port and a second port are mounted on a first end of the detecting module, and a third port and a fourth port are mounted on a second end of the detecting module, the first, second, third, and fourth ports of the detecting module are respectively connected to the first, second, third, and fourth ports of the first and second connectors.

4. The switch circuit as recited in claim 3, wherein the detecting unit further comprises a first switch, a second switch, a third switch, and a fourth switch, the first switch is connected between the second port of the first connector and the first port of the detecting module, the second switch is connected between the third switch of the switch module and the second port of the detecting module, the third is connected between the fourth port of the second connector and the third port of the detecting module, and the fourth switch is connected between the third port of the second connector and the fourth port of the detecting module.

5. The switch circuit as recited in claim 1, wherein when the lamp tube is an LED lamp tube with two conductive pins as the two pins on the end of the lamp tube and two insulation pins as the another two pins on the opposite end of the lamp tube, the two conductive pins are connected to the third and fourth ports and the two insulation pins are connected to the first and second ports, and the first and fifth switches are turned on and the second, third, fourth and sixth switches are turned off.

6. The switch circuit as recited in claim 1, wherein when the lamp tube is a fluorescent lamp tube, the second, fourth and sixth switches are turned on and the first, third and fifth switches are turned off.

7. A method for providing power to a selected lamp tube of different types of lamp tubes applied in a switching circuit, the types of lamp tubes comprising LED types and fluorescent types, the switching circuit comprising a first connector and a second connector for connecting the selected lamp tube therebetween, a power port for connecting a power supply, and a switch module connected among the power port, the first connector and second connector, the switch module comprises at least six switches, a ballast and a starter, the selected lamp tube having two pins on an end thereof and another two pins on an opposite end thereof, the method comprising:
- connecting the selected lamp tube to the first and second connectors of the switching circuit;
- detecting the impedances between each two pins of the pins of the selected lamp tube;
- determining a type of the selected lamp tube according to the detected impedances; and
- turning on at least two of the switches of the switch module and turning off the other ones of the switches of the switch module according to the determined type of the selected lamp tube to form a drive circuit to have power from the power supply flowing through the selected lamp tube to drive the selected lamp tube to light.

* * * * *